Patented Nov. 3, 1925.

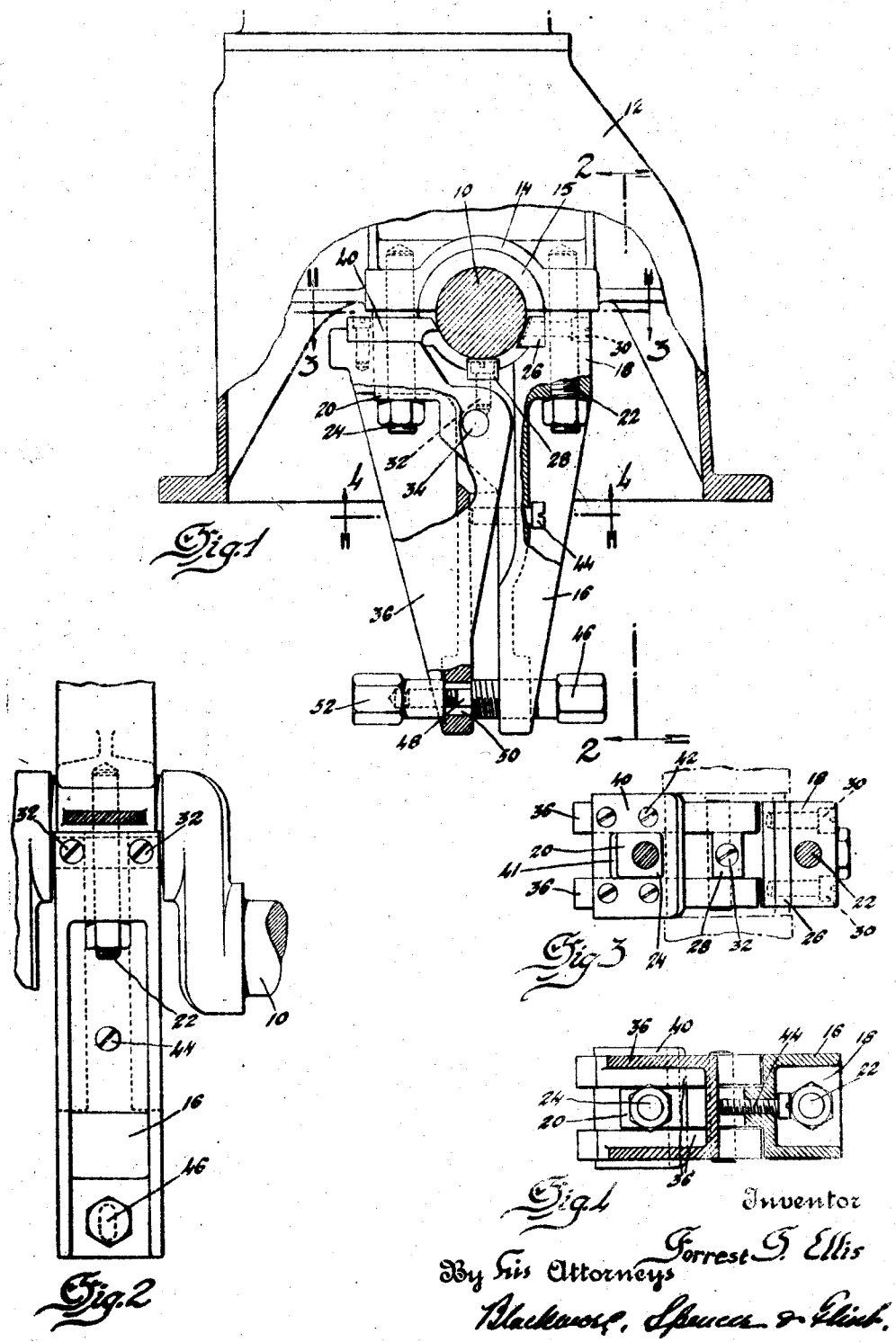

1,560,152

UNITED STATES PATENT OFFICE.

FORREST T. ELLIS, OF DETROIT, MICHIGAN, ASSIGNOR TO GENERAL MOTORS CORPORATION, OF DETROIT, MICHIGAN, A CORPORATION OF DELAWARE.

CRANK-SHAFT-TURNING DEVICE.

Application filed November 12, 1923. Serial No. 674,330.

*To all whom it may concern:*

Be it known that I, FORREST T. ELLIS, a citizen of the United States of America, and a resident of Detroit, county of Wayne, and State of Michigan, have invented certain new and useful Improvements in Crank-Shaft-Turning Devices, of which the following is a full, clear, concise, and exact description, such as will enable others skilled in the art to which the invention relates to make and use the same, reference being made therein to the accompanying drawings, which form a part of this specification.

This invention relates to tools, and is illustrated as embodied in a device for turning one of the bearing portions of the crankshaft of an automobile. An object of the invention is to provide a simple device which will operate accurately and efficiently, and preferably one which can be used to operate on a crankshaft without removing the crankshaft from its bearings.

Having this object in view, the invention contemplates the provision of a cutting or abrading implement, or an equivalent tool, supported in a novel manner to permit it to operate on a crankshaft, preferably without removing the crankshaft from its bearings. In one desirable construction, this crankshaft treating tool is supported by a member which is constructed and arranged to be secured adjacent the crankshaft in the place of one of the parts of a separable bearing for the crankshaft; in the particular arrangement shown in the accompanying drawings, this member is provided with perforated lugs to receive attaching bolts such as are usually used for the removable part of such a separable bearing. I prefer to mount on this member crankshaft positioning or gauging means.

This invention may be regarded from a different point of view as relating to an improved construction for accurately controlling the position of an arm carrying a crankshaft treating tool such as above described, with respect to a stationary supporting member on which the arm is movably mounted, to permit accurate adjustment of the tool to remove a very small amount of material from the crankshaft. Preferably, for the reasons set forth above, this stationary supporting member is constructed and arranged as described to be secured to one part of a separable crankshaft bearing in the place of the usual removable part of the bearing. In the arrangement shown in the drawings there is an adjusting device threaded in the supporting member and engaging the arm and which can be manipulated to control their relative positions.

Another feature of the invention relates to supporting the crankshaft rigidly opposite the tool, by means of a semi-cylindrical bearing member, which may be the fixed part of the regular bearing, associated with gaging and supporting means preferably including a support opposite the semi-cylindrical member and a support opposite the tool.

The above and other objects and features of the invention, including various novel combinations of parts and desirable particular constructions, will be apparent from the following description of one illustrative embodiment shown in the accompanying drawings, in which:

Figure 1 is a view partly in end elevation and partly in vertical transverse section showing part of an internal combustion engine with my novel crankshaft treating device secured in position to operate on the crankshaft;

Figure 2 is a section on the line 2—2 of Figure 1 showing the crankshaft treating device in side elevation;

Figure 3 is a section on the line 3—3 showing the crankshaft treating tool in top plan; and Figure 4 is a section on the line 4—4 showing the manner of securing the supporting member to the upper part of the crankshaft bearing.

In the arrangement selected for illustration, my novel crankshaft treating device is shown as being used to turn one of the bearing portions of the crankshaft 10 of an internal combustion engine having a crankcase 12 formed in the usual manner to provide a permanent crankshaft bearing part 14 having a half bushing 15, and which is arranged to cooperate with a removable part to support the crankshaft. As explained above, the crankshaft treating device comprises a supporting member 16 having portions 18 and 20 at its upper end perforated to receive clamping bolts 22 and 24 extending into the part 14 of the bearing. The part 14 has oppositely extending lugs on opposite sides of the crankshaft which are tapped to receive these bolts, which may be of any form suitable to hold the usual separable part of generally similar form. I prefer to provide the supporting member 16 with crankshaft engaging and positioning parts or gauges 26 and 28 adjustably held in place by adjusting screws 30 and 32.

Pivotally mounted on the supporting member 16 at 34 is an arm 36 recessed as shown in Figures 3 and 4 to provide connected sides straddling the portion 20 of member 16. The arm 36 is provided with a cutting or abrading implement, or an equivalent tool, such as the cutter 40, shown as provided with an opening 41 to permit it to move with respect to the portion 20 of member 16 (Figure 3), and which is fastened to the arm 36 by tapped screws 42 or in any other suitable manner. The idle position of the arm 36 is adjustably determined by a set screw 44 threaded in the member 16 and engaging the arm 36.

At the bottom of the member 16 there is threaded an adjusting device 46 having a threaded extension 48 passing through an oval opening 50 in the arm 36 and provided with a clamping nut 52. By this arrangement, as the cutter 40 operates on the crankshaft, the arm 36 may be rocked slightly to increase the depth of the cut by loosening the nut 52 and then tightening up the adjusting device 46, thus rocking the arm 36 about its pivot 34.

In operation, the device is mounted as shown in Figure 1, and the crankshaft is then turned in its bearings to cause the tool 40 to remove the desired amount of material from the bearing portion of the crankshaft. If it is desired to increase the depth of the cut the nut 52 is loosened and adjusting device 46 is tightened as explained above. One great advantage of my improved crankshaft treating device is that it permits operation on the crankshaft, especially at its center bearing or at an intermediate bearing if there be more than three, without removing the crankshaft from its place in the crankcase or removing anything but the lower half of the one bearing for which the crankshaft treating device is to be substituted. Another great advantage, whether or not the invention is embodied in a tool for operating on the shaft while it remains in its regular bearings, is that the shaft is supported with great rigidity, thus permitting the tool to turn a truly cylindrical surface.

While one illustrative embodiment of my invention has been described in detail it is not my intention to limit its scope to that embodiment or otherwise by the terms of the appended claims.

I claim:

1. A crankshaft treating device comprising, in combination, a member having opposite perforated lugs to receive clamping bolts passing into one part of a separable crankshaft bearing, a crankshaft engaging and supporting part mounted on said member between the lugs, and an arm movably mounted on said member and having a crankshaft treating tool arranged to engage and operate on the crankshaft.

2. A crankshaft turning device comprising, in combination, a member constructed and arranged to be secured to one part of a separable crankshaft bearing, an arm movably mounted on said member, and a crankshaft turning tool carried by said arm in position to engage and operate on the crankshaft.

3. A crankshaft turning device comprising, in combintion, a member constructed and arranged to be secured to one part of a separable crankshaft bearing, an arm pivoted thereto, a crankshaft turning tool carried by the arm, and means controlling the relative positions of the arm and said member.

4. A crankshaft treating device comprising, in combination, a member constructed and arranged to be secured to one part of a separable crankshaft bearing, an arm movably mounted thereon, a crankshaft treating tool carried by the arm, and a manually movable part engaging the arm and said member and adjustably controlling their relative positions.

5. A crankshaft treating device comprising, in combination, a member constructed and arranged to be secured to one part of a separable crankshaft bearing, an arm pivoted to said member, a tool carried by the arm, and manually adjustable means for rocking the arm to adjust the position of the tool.

6. A crankshaft treating device comprising, in combination, a member constructed and arranged to be secured to one part of a separable crankshaft bearing, an arm pivoted thereto, a tool carried by the arm, and an adjusting device threaded in said member and engaging the arm for controlling their relative positions.

7. A crankshaft treating device comprising, in combination, a stationary supporting member, crankshaft positioning means carried thereby, an arm pivoted thereon, a tool carried by the arm, and an adjusting device for controlling the relative position of said member and the arm.

8. A crankshaft turning device comprising, in combination, a stationary supporting member, crankshaft positioning means mounted thereon, an arm pivoted thereto, a cutting tool carried by the arm, and an adjusting device threaded in said member and engaging the arm for controlling their relative positions.

9. A tool comprising, in combination, a supporting member having diverging portions to be secured in place on opposite sides of a piece of work, an arm having connected sides straddling one of the portions and pivoted thereto, and a tool carried by the arm which has a relatively large opening for said portion which permits movement of the arm.

In testimony whereof I affix my signature.

FORREST T. ELLIS.